US012767317B2

(12) United States Patent
Liles

(10) Patent No.: US 12,767,317 B2
(45) **Date of Patent: *Oct. 20, 2026**

(54) BIFURACTING LAYUP FOR AIRFOIL RIB, METHODS OF MANUFACTURE THEREOF AND ARTICLES COMPRISING THE SAME

(71) Applicant: RTX Corporation, Farmington, CT (US)

(72) Inventor: Howard J. Liles, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/802,099

(22) Filed: Aug. 13, 2024

(65) Prior Publication Data

US 2024/0400188 A1 Dec. 5, 2024

Related U.S. Application Data

(63) Continuation of application No. 17/180,141, filed on Feb. 19, 2021, now Pat. No. 12,077,288.

(51) Int. Cl.
*B64C 3/18* (2006.01)
*B64C 3/26* (2006.01)

(52) U.S. Cl.
CPC ................ *B64C 3/187* (2013.01); *B64C 3/26* (2013.01)

(58) Field of Classification Search
CPC .................................. B64C 3/187; B64C 3/26
See application file for complete search history.

(56) References Cited

U.S. PATENT DOCUMENTS

| | | | |
|---|---|---|---|
| 7,600,979 B2 * | 10/2009 | Steibel | C04B 35/573 416/229 A |
| 10,253,639 B2 | 4/2019 | Sippel et al. | |
| 10,408,084 B2 | 9/2019 | Thomas et al. | |
| 10,563,522 B2 | 2/2020 | Thomas et al. | |
| 11,125,087 B2 | 9/2021 | Propheter-Hinckley et al. | |
| 11,180,999 B2 * | 11/2021 | Decesare | C04B 38/0003 |
| 11,506,065 B1 * | 11/2022 | Kim | C04B 35/80 |
| 2013/0004715 A1 | 1/2013 | Jarmon et al. | |
| 2013/0251939 A1 * | 9/2013 | Kleinow | B32B 18/00 156/89.11 |
| 2014/0284431 A1 * | 9/2014 | Grankaell | B64C 3/20 428/161 |

(Continued)

FOREIGN PATENT DOCUMENTS

| | | |
|---|---|---|
| EP | 2540479 A1 | 1/2013 |
| EP | 3054096 A1 | 8/2016 |
| EP | 3508317 A2 | 7/2019 |

OTHER PUBLICATIONS

Extended European Search Report for EP Application No. 22151773.3; Report mail date Jul. 21, 2022 (6 pages).

*Primary Examiner* — Michael H Wang
(74) *Attorney, Agent, or Firm* — CANTOR COLBURN LLP

(57) ABSTRACT

An airfoil comprises a wall that defines a leading edge and a trailing edge and one or more cavities located within the wall along with a rib that separates the cavities. The rib or the wall comprises a first split ply that comprises a consolidated section and two or more split sections; wherein the split sections emanate from the consolidated section; and where the split sections define the wall and the cavities of the airfoil.

12 Claims, 3 Drawing Sheets

(56) References Cited

U.S. PATENT DOCUMENTS

| | | | | |
|---|---|---|---|---|
| 2017/0174313 | A1* | 6/2017 | Brakes | B64F 5/10 |
| 2017/0356296 | A1* | 12/2017 | Tibbott | F01D 5/188 |
| 2019/0211695 | A1* | 7/2019 | Propheter-Hinckley | F01D 5/186 |
| 2022/0001973 | A1* | 1/2022 | Block | F16B 37/048 |
| 2022/0033058 | A1* | 2/2022 | Behzadpour | B64D 37/04 |
| 2022/0033061 | A1* | 2/2022 | Behzadpour | B64F 5/10 |
| 2022/0154587 | A1* | 5/2022 | Sobanski | F01D 9/041 |
| 2022/0266977 | A1 | 8/2022 | Liles | |
| 2022/0315230 | A1 | 10/2022 | Fulcher et al. | |
| 2023/0272720 | A1* | 8/2023 | Fernandez | F01D 5/282 416/230 |
| 2023/0383657 | A1* | 11/2023 | Kim | F01D 5/284 |
| 2025/0137375 | A1* | 5/2025 | Banhos | F01D 5/08 |

* cited by examiner

BIFURACTING LAYUP FOR AIRFOIL RIB, METHODS OF MANUFACTURE THEREOF AND ARTICLES COMPRISING THE SAME

CROSS-REFERENCE TO RELATED APPLICATIONS

This application is a continuation of U.S. application Ser. No. 17/180,141 filed Feb. 19, 2021, the disclosure of which is incorporated herein by reference in its entirety.

BACKGROUND

This disclosure relates to a bifurcating layup for an airfoil rib.

The layup of a composite airfoil shape is integral to its function, structural integrity and durability during its operation in an engine environment. It is desirable to orient the fibers and plies of the layup in such a way to provide structural support in primary load directions. It is also sometimes desirable to divide an airfoil into multiple cavities. A means of orienting the plies in a way that accomplishes these goals in a straightforward and easily manufacturable manner is desirable.

SUMMARY

In one embodiment, an airfoil comprises a wall that defines a leading edge and a trailing edge and one or more cavities located within the wall along with a rib that separates the cavities. The rib or the wall comprises a first split ply that comprises a consolidated section and two or more split sections; wherein the split sections emanate from the consolidated section; and where the split sections define the wall and the cavities of the airfoil.

In another embodiment, the two or more split sections emanate from one end of the consolidated section.

In yet another embodiment, the two or more additional split sections that emanate from an end opposite the one end of the consolidated section.

In yet another embodiment, the rib or the wall further comprises a plurality of non-split plies.

In yet another embodiment, the rib comprises a second split ply that has a split that is opposite in direction to the split in the first split ply.

In yet another embodiment, the rib comprises a non-split ply located between the first split ply and the second split ply.

In yet another embodiment, the rib further comprises a noodle located in the consolidated section.

In yet another embodiment, the rib further comprises a noodle located at the split in the split ply.

In yet another embodiment, the split plies overlap with each other at an end opposite the split.

In yet another embodiment, the split plies are butt jointed to each other at an end opposite the split.

In yet another embodiment, the split ply in the wall is located at the trailing edge of the airfoil.

In an embodiment, a method of manufacturing an airfoil comprises winding on a plurality of mandrels a plurality of plies to form a preform; wherein at least one ply of the plurality of plies is a split ply. The split ply comprises a consolidated section and a split section, where the consolidated section is located at a rib or a wall of the airfoil and where the split sections define the wall or a cavity in an airfoil. The preform is subjected to chemical vapor infiltration, polymer infiltration pyrolysis, melt infiltration, or a combination thereof. The preform is cooled to form the airfoil.

In another embodiment, a chemical vapor in the chemical vapor infiltration process comprises SiC, $Al_2O_3$, BN, $B_4C$, $Si_3N_4$, $MoSi_2$, $SiO_2$, SiOC, SiNC, and/or SiONC.

In yet another embodiment, the plurality of plies comprise silicon carbide fibers.

In yet another embodiment, the split section emanates from one end of the consolidated section.

In yet another embodiment, the airfoil comprises two or more cavities, wherein the cavities are separated by the rib.

In yet another embodiment, the rib comprises a second split ply that has a split that is opposite in direction to the split in the first split ply.

In yet another embodiment, the rib further comprises a non-split ply located between the first split ply and the second split ply.

In yet another embodiment, the ply comprises an additional split section that emanates from an end opposite the one end of the consolidated section.

In yet another embodiment, the split plies are butt jointed to each other at an end opposite the split.

DETAILED DESCRIPTION

Disclosed herein is an airfoil that comprises a split ply in an airfoil rib. The split ply comprises a first section that comprises a first plurality of plies that are in contact with a second section where the first plurality of plies are split off into two or more second pluralities of plies. The first section is referred to herein as the consolidated section, while the second section is referred to herein as the split section. In an embodiment, the total number of plies in the pluralities of split sections is equal to the total number of plies in the consolidated section. In an embodiment, the split section comprises two sections and is termed the bifurcated section. The split section may comprise 2 or more sections, 3 or more sections, 4 or more sections, and so forth.

The plies disclosed herein may include both 2D plies and 3D plies. The plies disclosed herein may be manufactured via multiple techniques including but not limited to the following a) a traditional 2D layup comprised of stacking plies (including the bifurcating fabric structure discussed in this disclosure; b) alternative weaving techniques to create the structure such as 1) 3D weaving via the use of a jacquard loom or other loom which controls individual fiber placement within a fabric structure; 2) pin weaving; and 3) “sewn together” plies.

In an airfoil, the consolidated section generally defines a rib in the airfoil, while the split section generally defines the wall of the airfoil and/or opposing cavities (disposed on opposing sides of a rib) in the airfoil. In an exemplary embodiment, the split ply comprises a bifurcated ply. The bifurcated ply may be used to reinforce the rib and to facilitate the formation of cavities in the airfoil. In another embodiment, the airfoil rib may be formed using two or more split plies, where the split in one ply is opposedly oriented to the split in the neighboring ply.

Figure 1B:
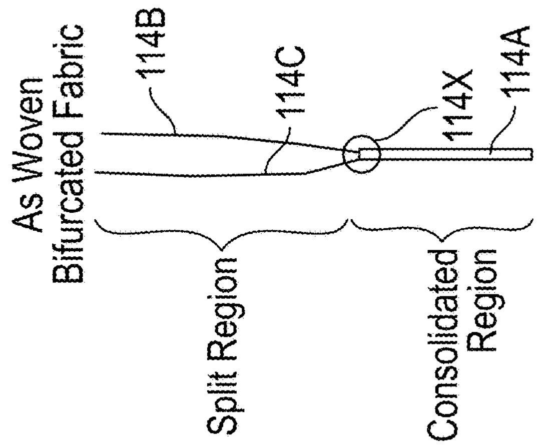
FIG. 1B depicts a bifurcated ply.
Figure 1A:
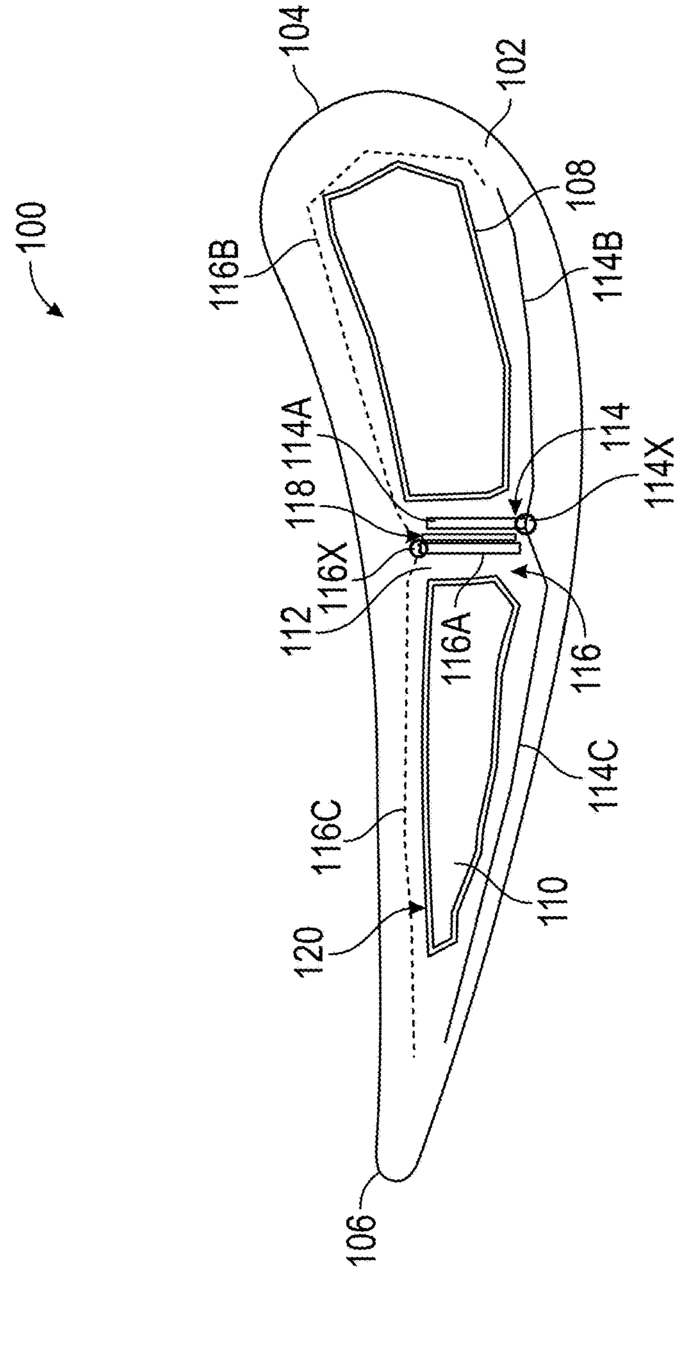
FIG. 1A depicts an exemplary schematic an airfoil that uses a bifurcated ply in a rib.

FIG. 1A depicts an exemplary schematic an airfoil 100 comprising a wall 102 with a leading edge 104 and a trailing edge 106. The wall 102 encompasses two or more cavities 108 and 110 (through which hot gases or cooling gases are transported) separated by one or more ribs 112. The rib 112 provides structural support for the wall 102 during high temperature operation of the airfoil 100.

The rib 112 comprises one or more of the split plies disclosed herein. In an embodiment depicted in the FIG. 1A, the rib 112 comprises 2 or more split plies 114, 116 where the split section 114X in one split ply 114 is in the opposite direction from the split section 116X neighboring split ply 116. FIG. 1B is an enlarged exemplary depiction the split ply 114. The split ply 114 comprises a consolidated section 114A which splits at separation point 114X into two split plies 114B and 114C. Since the consolidated section 114A splits into two plies 114B and 114C, the separation point 114X may also be termed the bifurcation point and the entire layup is termed a bifurcation layup.

With reference now again to the FIG. 1A, the two split plies 114B and 114C diverge in opposite directions from the consolidated ply 114A. Similarly, the two split plies 116B and 116C diverge in opposite directions from the consolidated ply 116A. The split plies 114B and 116B protrude in opposite directions from each other to facilitate the formation of the first cavity 108, while the split plies 114C and 116C protrude in opposite direction from each other to facilitate the formation of the second cavity 110. The ends of the split plies 114B and 116B can either overlap or form a butt joint (not shown). This design can be used to constrain and position the plies that define the internal cavity.

Additional plies that are not split may be used in the rib 112 and the wall 102 can contain additional plies (that are not split plies-hereinafter termed non-split plies) to provide the desired geometry and reinforcement for the airfoil. In an embodiment, the rib 112 comprises a plurality of non-split plies 118 in addition to the split plies. In other words, the rib can be further thickened to reach a desired thickness by inserting a piece of fabric or insert between the consolidated sections of the split plies. The non-split plies 118 can reside between the consolidated sections of the split plies or alternatively, lie outside of the consolidated sections of the split plies (not shown).

Additional non-split plies 120 may also be used in the wall 102 to provide desired reinforcement and to define the geometry of the wall. In other words, the wall can be further thickened to reach a desired thickness by inserting a piece of fabric or insert between the surface of the wall and the split ply. The non-split plies can be manufactured from the same materials as the split plies. In an embodiment, the non-split plies can be manufactured from materials that are different from those used in the split plies.

The consolidated section can comprise 10 or more plies, 20 or more plies, 50 or more plies, or 100 or more plies as desired for section thickness. The split section can comprise a 10:90 to 90:10 split ratio between plies that emanate from the consolidated section. In other words, with reference to FIG. 1A, the split section 114B can contain 10% or more of the plies used in the consolidated section, while the split section 114C can contain 90% or less of the plies used in the consolidated section. In an embodiment, the split section can comprise a 20:80 to 80:20 split ratio between plies that emanate from the consolidated section. In yet another embodiment, the split section can comprise a 40:60 to 60:40 split ratio between plies that emanate from the consolidated section.

Figure 2:
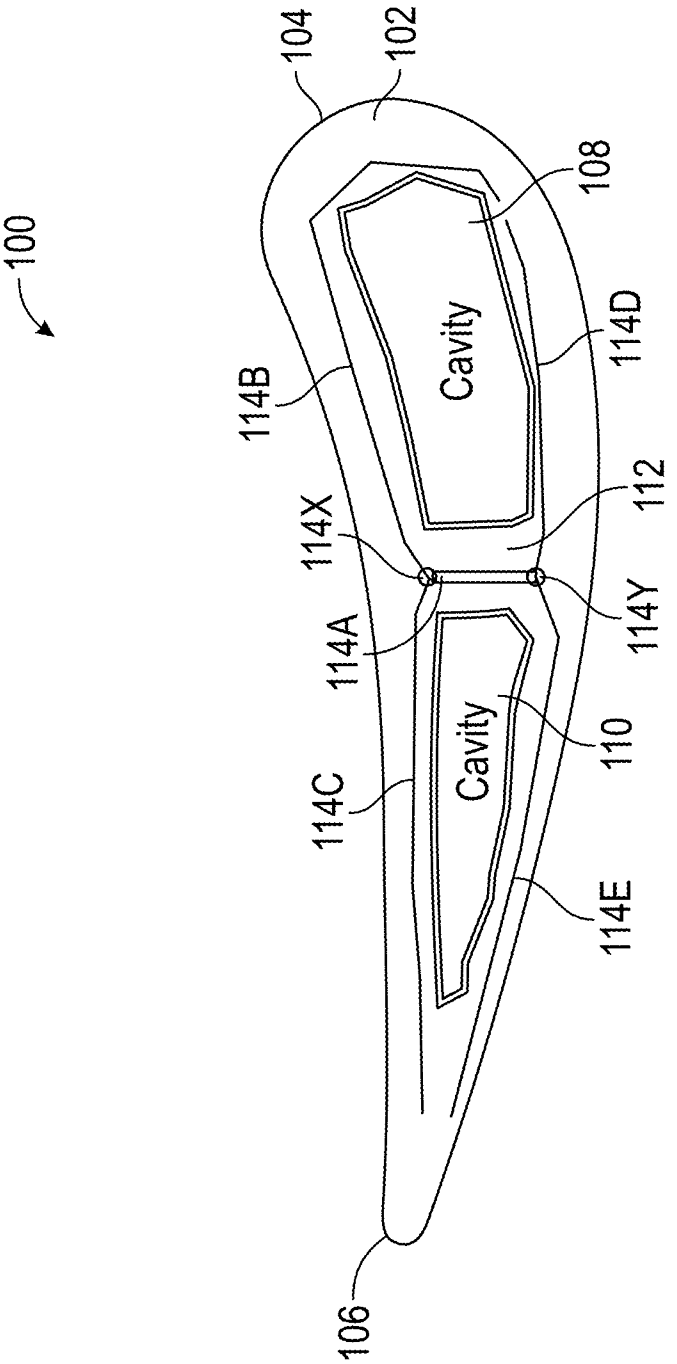
FIG. 2 depicts another exemplary schematic of an airfoil that uses another bifurcated ply in a rib.

In an embodiment, the fabric of the ply bifurcates in two directions from a single consolidated section. FIG. 2 exemplifies this embodiment where the consolidated ply 114A is located in the rib 112 and where the consolidated ply 114A is split into a plurality of plies at opposing ends 114X and 114Y (of the consolidated ply). As with the embodiment depicted in the FIG. 1A, the split plies 114B, 114C, 114D and 114E of the FIG. 2 all emanate from the consolidated ply 114A. This configuration is referred to as the "I" weave because of the I-shape of the ply. The split plies are used to facilitate improving the strength of the wall and providing it with the desired geometry. The numbers cited above for the consolidated ply and the ratio of the split plies (detailed for the FIG. 1A) hold good for the FIG. 2 as well.

Figure 3:
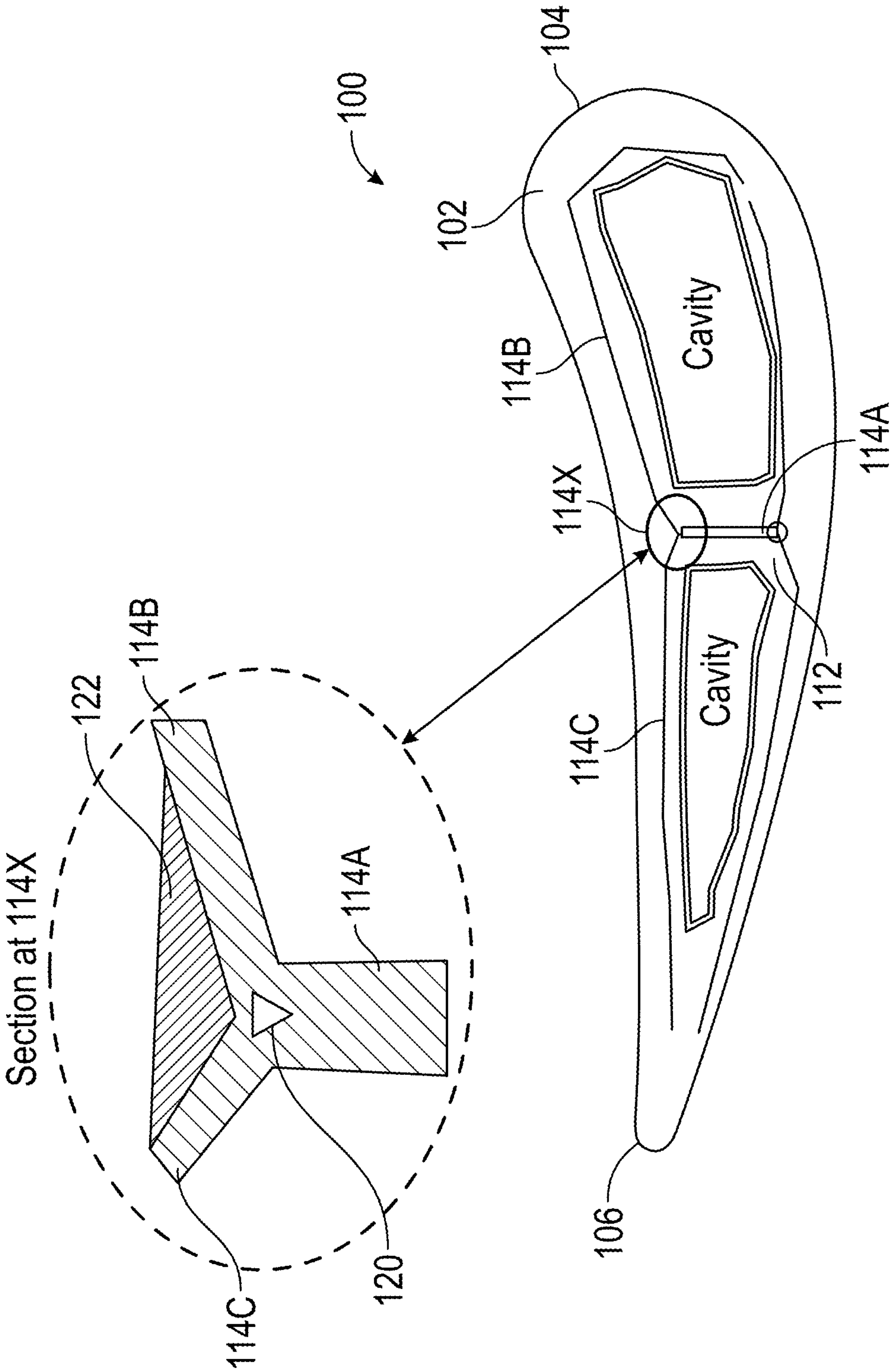
FIG. 3 depicts another exemplary schematic of an airfoil that uses another bifurcated ply in a rib.

In an embodiment, one or more noodles may be incorporated into the split region of the plies. FIG. 3 depicts one such embodiment where the consolidated ply 114A is located in the rib 112 and where at least one end of the consolidated ply comprises a first noodle section 120 with the consolidated ply. The consolidated ply further comprises a second noodle section 122 that lies external to the consolidated ply and which facilitates the splitting of the consolidated ply into split plies 114B and 114C respectively. The split plies 114B and 114C emanate from the consolidated ply 114A. The split plies are used to facilitate improving the strength of the wall and providing it with the desired geometry.

While the FIGS. 1A, 2 and 3 depict the use of split plies at the rib in an airfoil it is to be noted that this configuration may be used at the leading edge and/or at the trailing edge of an airfoil if desired.

In one embodiment, in one method of manufacturing an airfoil using split plies, a series of mandrels are wound with the plies (both split and non-split) to take the basic configuration of an airfoil. The mandrels are located where the cavities in the airfoil are desired and the fabric is wound around the mandrel. The prefabricated airfoil with the fabric wound round the mandrels is placed in a chemical vapor infiltration (CVI) chamber and subjected to vapor infiltration. Other methods of infiltration that may be used include polymer infiltration pyrolysis, melt infiltration, and the like. The infiltration produces a ceramic matrix and the combination of the plies together with the ceramic matrix produces the ceramic matrix composite.

The fibers in the plies can be ceramic fibers. Ceramic fibers of preform plies as set forth herein can have a polycrystalline structure. In one embodiment, ceramic fibers of preform plies can include a non-stoichiometric chemical composition or can include a stoichiometric chemical composition.

In one embodiment, ceramic fibers of preform plies can include an inhomogeneous chemical composition. In one embodiment ceramic fibers of preform plies are single crystal fibers, polycrystalline fibers or by amorphous fibers. In an embodiment, ceramic fibers of the preform plies can comprise silicon carbide (SiC), carbon, alumina ($Al_2O_3$), mullite ($Al2O_3$—$SiO_2$), or a combination thereof. The preform may then be subject to forces that produce a desired shape. The laminated preform is then subjected to chemical vapor infiltration (in a chemical vapor infiltration (CVI) treatment chamber reactor) to encapsulate the fibers in a ceramic matrix.

The preform provides reinforcement for a ceramic matrix composite (CMC) formed by subjecting a preform to CVI, polymer infiltration pyrolysis, melt infiltration, or the like. An appropriate gas for CVI can include, for example, any one of, or a mixture of two or more of, hydrogen, methyltrichlorosilane, boron trichloride, ammonia, trichlorosilane, and a hydrocarbon gas. An appropriate gas can include, e.g., any silane containing vapor as well as any siloxane, silazane, or other silicon containing vapor. The gas within the CVI treatment chamber reactor can be devoid of a primary flow direction. Providing a gas within a chamber reactor to be devoid of a primary flow direction can reduce processing cost.

The temperature within the CVI chamber can be raised, and the reactant gases can undergo a chemical reaction at high temperature. During a reaction a matrix coating can be formed on surfaces of fibers of the preform. Where fibers of a preform as set forth herein are provided by an SiC fiber a matrix consisting of, e.g., SiC, $Al_2O_3$, BN, $B_4C$, $Si_3N_4$, $MoSi_2$, $SiO_2$, SiOC, SiNC, and/or SiONC can be formed on fibers of the preform to define a densified CMC structure.

After condensation and cooling of the vapors, the mandrel can be removed and the airfoil subjected to finishing processes.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An airfoil comprising:

a wall that defines a leading edge and a trailing edge;

one or more cavities located within the wall; and a rib; where at least two cavities are separated by the rib; wherein the rib or the wall comprises two or more neighboring split plies, each of which comprises a consolidated section and one or more split sections; wherein the split sections emanate from the consolidated section; and where the split sections define the wall and the cavities of the airfoil; where a split in one ply is opposedly oriented to a split in a neighboring ply; wherein a non-split ply is disposed between the consolidated sections of two or more neighboring split plies; wherein the consolidated section comprises 10 or more plies; and wherein each ply section comprises a 10:90 to 90:10 split ratio between plies that emanate from the consolidated section.

2. The airfoil of claim 1, where the two or more ply sections emanate from one end of the consolidated section.

3. The airfoil of claim 1, wherein the rib or the wall further comprises a plurality of non-split plies.

4. The airfoil of claim 1, where the first ply section in the wall is located at the trailing edge of the airfoil.

5. The airfoil of claim 1, where the consolidated section comprises 50 or more plies.

6. The airfoil of claim 1, where the consolidated section comprises 100 or more plies.

7. The airfoil of claim 1, where each ply section comprises a 40:60 to 60:40 split ratio between plies that emanate from the consolidated section.

8. A method of manufacturing an airfoil comprising:

winding on a plurality of mandrels a plurality of plies to form a preform; wherein the preform comprises a first split ply and a neighboring second split ply; where the first split ply and the second split ply each comprises a consolidated section and a split section, wherein the split section comprises a first ply section and a second ply section; where the consolidated section is located at a rib or a wall of the airfoil and where the split sections define the wall or a cavity in an airfoil; where a split in the first split ply is opposedly oriented to a split in the neighboring second split ply; and where a non-split ply is disposed between the consolidated section of the first split ply and the consolidated section of the neighboring second split ply; wherein the consolidated section comprises 10 or more plies; and wherein the first ply section and the second ply section comprise a 10:90 to 90:10 split ratio between plies that emanate from the consolidated section;

subjecting the preform to chemical vapor infiltration, polymer infiltration pyrolysis, melt infiltration, or a combination thereof; and cooling the preform to form an airfoil.

9. The method of claim 8, wherein a chemical vapor in the chemical vapor infiltration process comprises SiC, $Al_2O_3$, BN, $B_4C$, $Si_3N_4$, $MoSi_2$, $SiO_2$, SiOC, SiNC, and/or SiONC.

10. The method of claim 8, wherein the plurality of plies comprise silicon carbide fibers.

11. The method of claim 8, where the first ply section and second ply section emanate from one end of the consolidated section.

12. The method of claim 8, wherein the cavity further comprises two or more cavities separated by the rib.

* * * * *